Nov. 24, 1931.                    M. H. PADE                    1,833,530
                        METHOD OF MANUFACTURING TIRES
                             Filed Sept. 5, 1925

INVENTOR.
MAX H. PADE.
BY
ATTORNEY.

Patented Nov. 24, 1931

1,833,530

UNITED STATES PATENT OFFICE

MAX H. PADE, OF AKRON, OHIO, ASSIGNOR TO THE FIRESTONE TIRE AND RUBBER COMPANY, OF AKRON, OHIO, A CORPORATION OF OHIO

METHOD OF MANUFACTURING TIRES

Application filed September 5, 1925. Serial No. 54,685.

This invention relates to procedure for manufacturing tire casings.

In the art of manufacturing tire casings, after the raw casing has been completed, it has been customary to insert a pressure bag therein, to clamp thereon bead molding or "bull" rings, to insert the tire between mold sections adapted to receive the same, and stack a number of molds in a heater press in which the tires are subjected to vulcanizing heat and pressure and are thus cured to shape.

The molds, after the curing operation, are removed from the heater, the sections separated, the tires removed, the molding rings are then pulled away from the tire to which they cling with considerable tenacity requiring strong manual labor for removal or the use of special machinery, and finally, the pressure bag is removed.

The general object of the present invention is to provide a procedure for vulcanizing tires whereby the use of bead molding rings may be dispensed with, the mold sections being provided with integral bead molding portions.

The foregoing and other objects are obtained by the procedure illustrated in the accompanying drawings and described below. It is to be understood that the invention is not limited to the specific form thereof illustrated and described.

Figure 1:
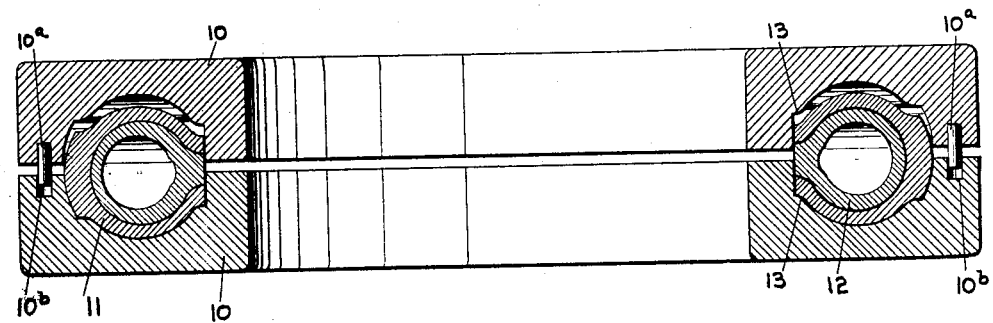
Figure 2:
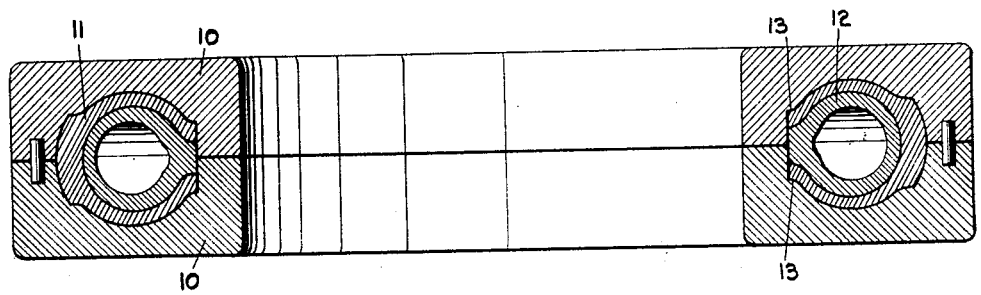

Of the accompanying drawings:

Figure 1 is a diametral section through a mold and tire as initially assembled; and Figure 2 is a diametral section through the mold and tire in the condition in which it is supplied to the usual heater press.

Referring to the drawings, 10, 10 are mold sections shaped to enclose a tire 11 into which an air or other pressure bag 12 has been inserted and formed with integral bead molding portions 13, 13. The present inventor has discovered that molds of this type may be successfully employed if each mold is preliminarily pressed to urge the mold sections together, as illustrated in Figure 2, prior to stacking in the heater. This step prevents the formation of defective tires by improper closing of the molds 10 which would result if a stack of twenty or so are pressed together at one time according to the usual custom.

In carrying out the method, any of the well-known vulcanizer conveyor systems may be employed, the mold sections 10 being caused to travel to and from the heaters and the tires 11 with inserted pressure bags 12 being mounted in the lower mold sections 10 while traveling. The upper mold sections may then be rested on the tires as indicated in Figure 1, dowels $10^a$ being aligned with dowel sockets $10^b$. The molds may then be delivered in this condition to a suitable press which will individually press together the sections of each mold, whereupon the molds may be delivered to, stacked, and cured in the heater press (not shown) in the ordinary way.

It will appear from the foregoing that by a simple procedure, the many operations incident to the employment of bead molding or "bull" rings have been avoided, and the molding of the bead portions of the tires is accomplished by the integral mold portions 13 in a highly effective manner.

It is also advantageous to practice the individual preliminary pressing of mold sections together, even though the old type using the molding rings is employed since the step of preliminary closing each mold obviates the danger of certain molds not closing properly in the stack.

Modifications of the invention may be resorted to without departing from the spirit thereof or the scope of the appended claims.

What is claimed is:

1. The method of preparing tires for vulcanization in a heater press in which a stack of unclamped two-part molds are compressed, which method comprises mounting a tire containing an expansible bag between separated non-clamping mold sections, and seating said tire in said sections by preliminarily pressing said sections together prior to delivery of the molds to said heater press.

2. The method of preparing tires for vulcanization in a heater press, in which a stack of unclamped two-part molds are compressed, which method comprises inserting an expansible bag in the tire, mounting the tire between non-clamping mold sections having integral bead molding portions, confining the beads of the tire between the expansible bag and the mold sections, and preliminarily pressing said sections together prior to delivery of the molds to said heater press.

MAX H. PADE.